United States Patent [19]

Ogikubo

[11] Patent Number: 5,270,528
[45] Date of Patent: Dec. 14, 1993

[54] RADIOMETER WITH CORRECTION DEVICE

[75] Inventor: Kazuhiro Ogikubo, Tokyo, Japan
[73] Assignee: NEC Corporation, Tokyo, Japan
[21] Appl. No.: 859,914
[22] Filed: Mar. 30, 1992

[30] Foreign Application Priority Data

Mar. 31, 1991 [JP] Japan .................................. 3-093076

[51] Int. Cl.$^5$ .................................................. G01J 1/20
[52] U.S. Cl. ........................... 250/201.7; 250/208.1
[58] Field of Search ................. 250/208.1, 216, 201.8, 250/201.9, 201.7; 356/218, 222, 225

[56] References Cited

U.S. PATENT DOCUMENTS 4,919,505  4/1990  Bartosiak et al. .
5,146,072  9/1992  Dey et al. ........................... 250/201.9

FOREIGN PATENT DOCUMENTS 0434567  6/1991  European Pat. Off. .
0468474  1/1992  European Pat. Off. .

OTHER PUBLICATIONS

J. M. Maisonneuve et al., "Spot In-Flight Calibration", 14th Congress of the International Society for Photogrammetry, pp. 600–607.
J. P. Midan, "IAF-83-109 The Spot-HRV Instrument: An Overview of Design and Performance", 34th Congress of the International Astronautical Federation, Oct. 10-15, 1983.

Primary Examiner—David C. Nelms
Attorney, Agent, or Firm—Sughrue, Mion, Zinn, Macpeak & Seas

[57] ABSTRACT

A radiometer mounted on an aircraft, satellite or similar flying body for observing reflections or radiations of visible rays or infrared rays from the land or the sea. The radiometer has optical means for receiving and converging the visible rays or infrared rays, light-sensitive elements to which the converged rays are incident, means for changing the optical distance between the light-sensitive elements and the optical means, and means for generating correction data while the focal distance of the optical means is deviated from the light-sensitive surface of the light-sensitive elements.

17 Claims, 5 Drawing Sheets

RADIOMETER WITH CORRECTION DEVICE

BACKGROUND OF THE INVENTION

1. Field of the Invention

The present invention relates to a radiometer and, more particularly, to a radiometer with a correction device for observing reflections or radiations of infrared rays or visible rays from a subject of observation.

2. Description of the Prior Art

A radiometer to be mounted on a flying body, e.g., an airplane or a satellite is disclosed in, for example, J. M. Maisonneuve and M. Dinguirard "SPOT IN-FLIGHT CALIBRATION", 14th CONGRESS OF THE INTERNATIONAL SOCIETY FOR PHOTOGRAMMETERY and J. P. Midan "THE SPOT-HRV (High Resolution Video) INSTRUMENT: AN OVERVIEW OF DESIGN AND PERFORMANCE", IFA 83-109 (1983).

The above-described type of radiometer is generally made up of a radiometer body mounted on the flying body and including a charge-coupled device (CCD) array or similar monodimensional array of photoelectric transducer means, and optics for conducting radiations/reflections from a subject of observation (e.g. land surface) lying in a predetermined width in a direction perpendicular to the direction of flight of the flying body and including a plane mirror. Since radiations/reflections from the subject of observation are extremely susceptible to meteorological conditions, a prerequisite with the observation is to constantly correct the sensitivity of the radiometer body to radiations/reflections in matching relation to the varying meteorological conditions.

One of conventional approaches for the above-mentioned correction is to locate a light source in the form of a lamp having a reference luminance in close proximity to the plane mirror. While ordinary observation is under way, the mirror held in a position optimal for conducting radiations/reflections to the photoelectric transducer is so driven as to conduct light issuing from the lamp to the transducer. After the correction, the mirror is restored to the original position.

Another conventional approach is to use sunlight in place of the light from the lamp. Still another conventional approach is to receive radiations/reflections from a particular range of the subject of observation (i.e. land surface) as a reference level.

The problem with the lamp scheme is that optics including lenses for defining the path for the reference light increases the overall size and weight of the radiometer. Another problem with this kind of scheme is that since the reference light path is offset in a plane perpendicular to the direction of light propagation of the optics, the reflection characteristic of the optics spaced apart from the reference light path or the change in the characteristic cannot be detected. For the same reason, the sunlight scheme cannot detect changes in the reflection characteristic or the transmission characteristic of part of the optics. In addition, the sunlight scheme has a drawback that when the photoelectric transducer is implemented by a linear array sensor or similar sensor having a broad visual field, changes in the sensitivity cannot be detected on a light-sensitive element basis since the apparent angle of sunlight is small (visual diameter of about 0.5 degree).

The conventional approach using radiations/reflections from a particular range as a reference input level as previously stated is free from the deviation of the reference optical path in the optics. However, this kind of scheme involves heavy limitations since a range where the radiation intensity is uniform is limited on the land surface.

OBJECT OF THE INVENTION

It is therefore an object of the present invention to provide a radiometer with a correction device which eliminates the influence of the deviation of an optical path for reference light in optics to thereby detect changes in the reflection characteristic or the transmission characteristic of part of the optics, insuring the accurate correction of sensitivity.

It is another object of the present invention to provide a radiometer with a correction device which is free from the influence of the scattering among the conversion efficiencies of elements constituting a photoelectric transducer device.

SUMMARY OF THE INVENTION

In accordance with the present invention, a radiometer mounted on a flying body for observing radiations or reflections of visible rays or infrared rays from the land or the sea comprises optical means for receiving and converging the visible rays or the infrared rays, light-sensitive means to which the converged light is incident, means for changing the optical distance between the light-sensitive means and the optical means, and means for generating reference input level data for correction while the focal point of the optical means is deviated from the light-sensitive surface of the light-sensitive means.

Preferably, the means for changing the optical distance comprises an actuator in the form of a wedge-shaped glass or a piezoelectric element disposed on the optical path. The actuator is connected to the light-sensitive means to move it in the direction of the optical axis of the optical means.

To generate the reference input level data, the light-sensitive means is moved in the direction of the optical path of the optical means or the optical distance from the optical means to the light-sensitive means is changed. In this condition, i.e., while the focal point of the optical means is deviated from the light-sensitive surface of the light-sensitive means, any desired range on the land is observed. At the same time, the luminance of the range of interest is measured to compensate for the diffusion and absorption ascribable to the atmosphere, whereby the radiometer is corrected.

By shifting the focal point, it is possible to conduct uniform light to the radiometer even when the subject of observation has a luminance distribution. Hence, uniform reference light is achievable over a broad visible range.

The present invention is, therefore, capable of detecting changes in the reflection characteristic of a plane mirror and the transmission characteristic of lenses included in the optics, the scattering among the sensitivities of all the light-sensitive elements, and fluctuations in the characteristic of an electric system at any desired frequency.

BRIEF DESCRIPTION OF THE DRAWINGS

The above-mentioned and other objects, features and advantages of the present invention will become more apparent by reference to the following detailed description of the invention taken in conjunction with the accompanying drawings wherein.

DETAILED DESCRIPTION OF THE INVENTION

Figure 1:
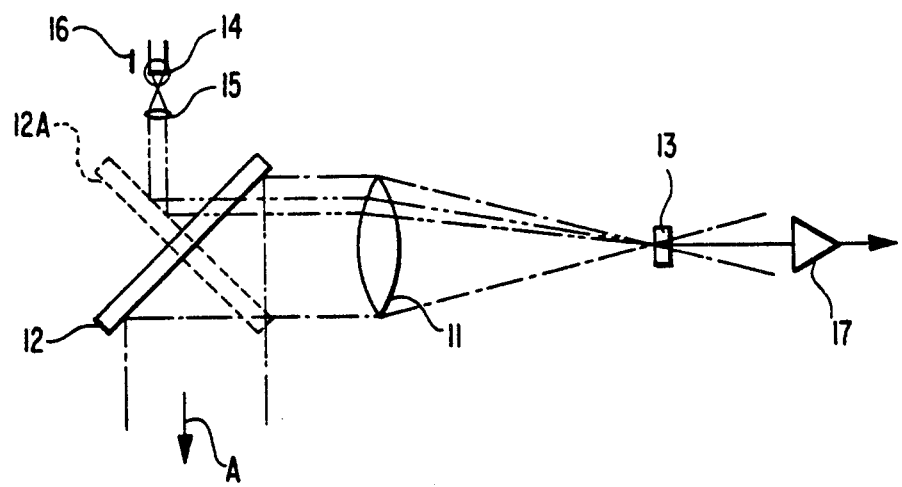
FIGS. 1, 2 and 3 are schematic representations of conventional radiometers.

To better understand the present invention, a brief reference will be made to a conventional radiometer, shown in FIG. 1. As shown, the radiometer includes a rotatable plane mirror 12 (held in a position indicated by a solid line) for converging infrared rays or visible rays from a subject of observation which exists in a direction indicated by an arrow A. The mirror 12 reflects the incident rays to optics 11. The optics 11 converges the incident rays to a detection unit 13 located at the focal point of the optics 11. The detection unit 13 converts the intensity of incident light to an electric signal and feeds the electric signal to an electric system 17.

The plane mirror 12 is rotatable to correct the transmission characteristic of the optics 11 which mainly converges the incident rays, the reflection characteristic of the mirror 12, the sensitivity fluctuation characteristic of the detection unit 13 (including sensitivity deviations the case of a plurality of elements), the characteristic of the electric system 17, etc. Specifically, when the mirror 12 is rotated toward a correction lamp 14 and a correction lens 15 and fixed in a position 12A indicated by a phantom line in the figure, visible rays or infrared rays from the lamp 14 are incident to the mirror 12 on the same optical path as the rays from the subject of observation. An optical sensor 16 is located in close proximity to the lamp, or reference light source, 14 to monitor the quantity of light issuing from the lamp 14, so that the radiometer may be corrected.

Figure 2:
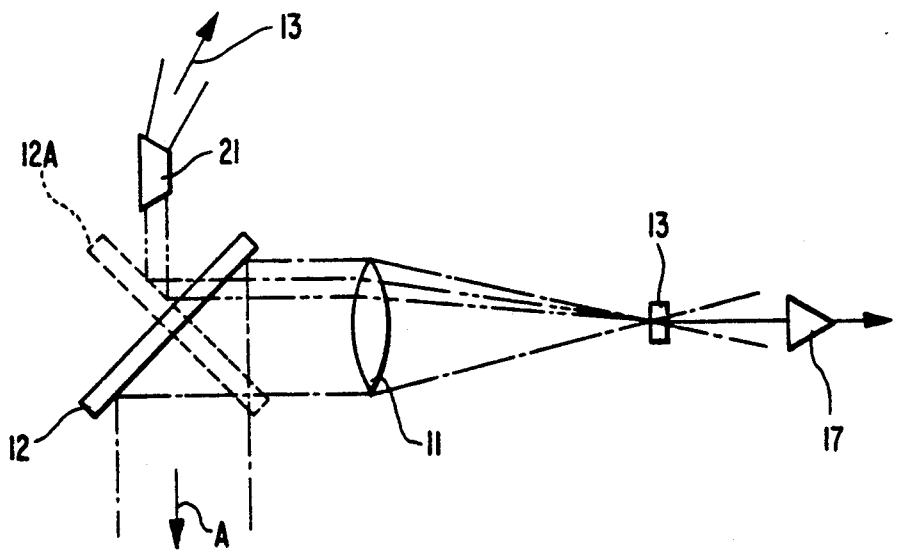

FIG. 2 shows another conventional radiometer having a solar prism 21. The solar prism 21 is rotatable to allow visible rays or infrared rays from the sun to be incident thereto as reference rays on the same optical path as the rays from a subject being observed.

Figure 3:
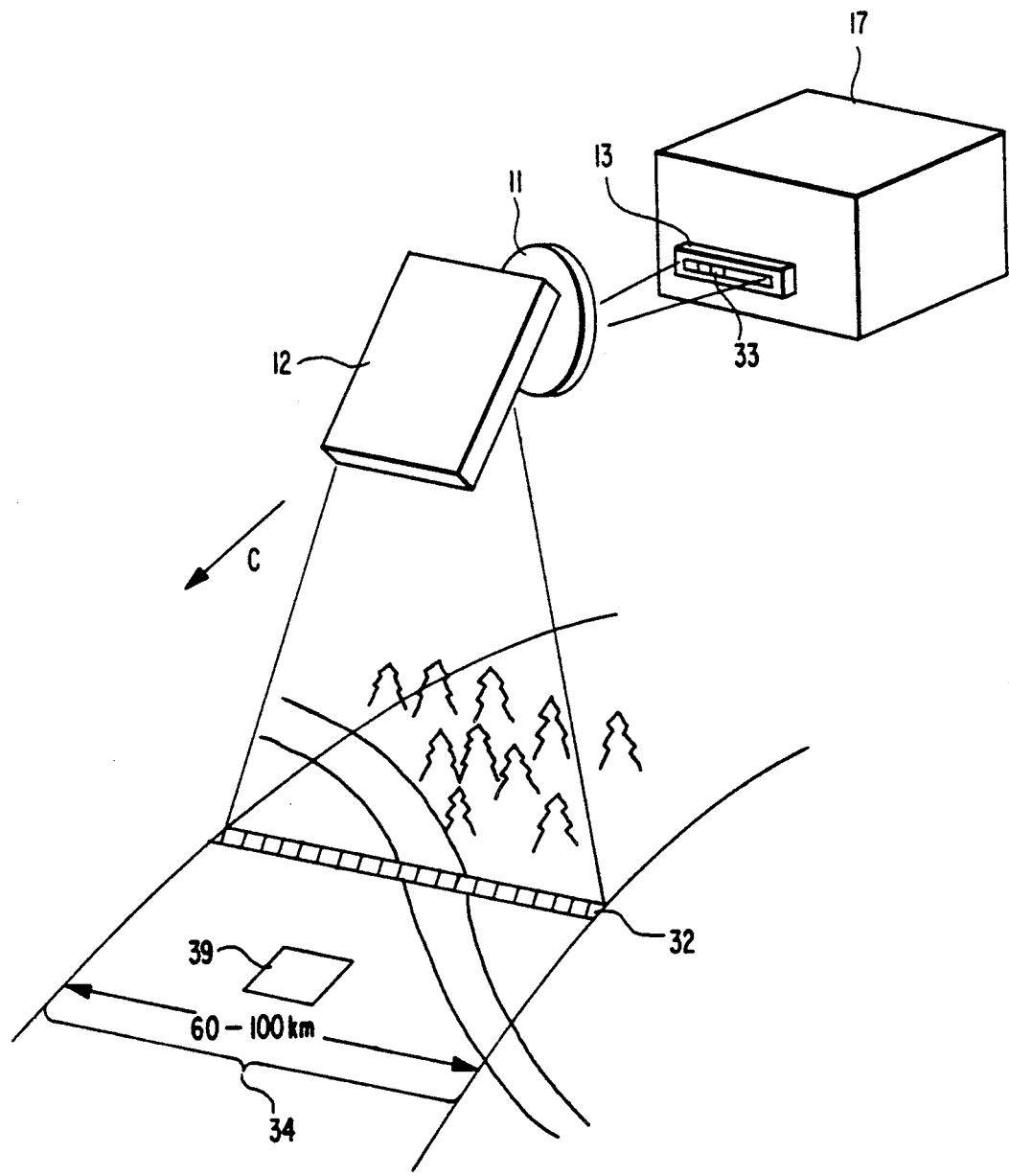

FIG. 3 shows still another conventional radiometer which uses reflections from objects located on the land surface. As shown, the radiometer photoelectrically converts an image representative of a subject of observation while moving in a direction indicated by an arrow C in the figure. Specifically, the radiometer includes a light-sensitive array 33 the projection of which defines a scanning line 32. Infrared rays or visible rays reflected from, among the objects on the earth, the objects covered by the scanning line 32 are reflected by the plane mirror 12 toward the optics 11. The optics 11 divides the reflection from the mirror 12 in association with the number of groups of light-sensitive elements located at the focal point of the optics 11. As a result, data matching the divided areas are outputted by the light-sensitive elements constituting the light-sensitive array of the detection unit 13.

In the condition shown in FIG. 3, a target 39 having a uniform luminance is positioned in a visual field range 34 which is, for example, 60 to 100 km wide. The radiometer observes the target, or reference light source, 39. At the same time, a corrected meter measures the luminance of the target 39 either on the ground or at a low flight altitude. Further, the diffusion and absorption by the atmosphere are compensated for to thereby correct the radiometer. The light-sensitive array 33 converts the intensity of light to an electric signal and delivers the electric signal to the electric system 17.

Referring to FIGS. 4-7, a radiometer embodying the present invention will be described.

Figure 4:
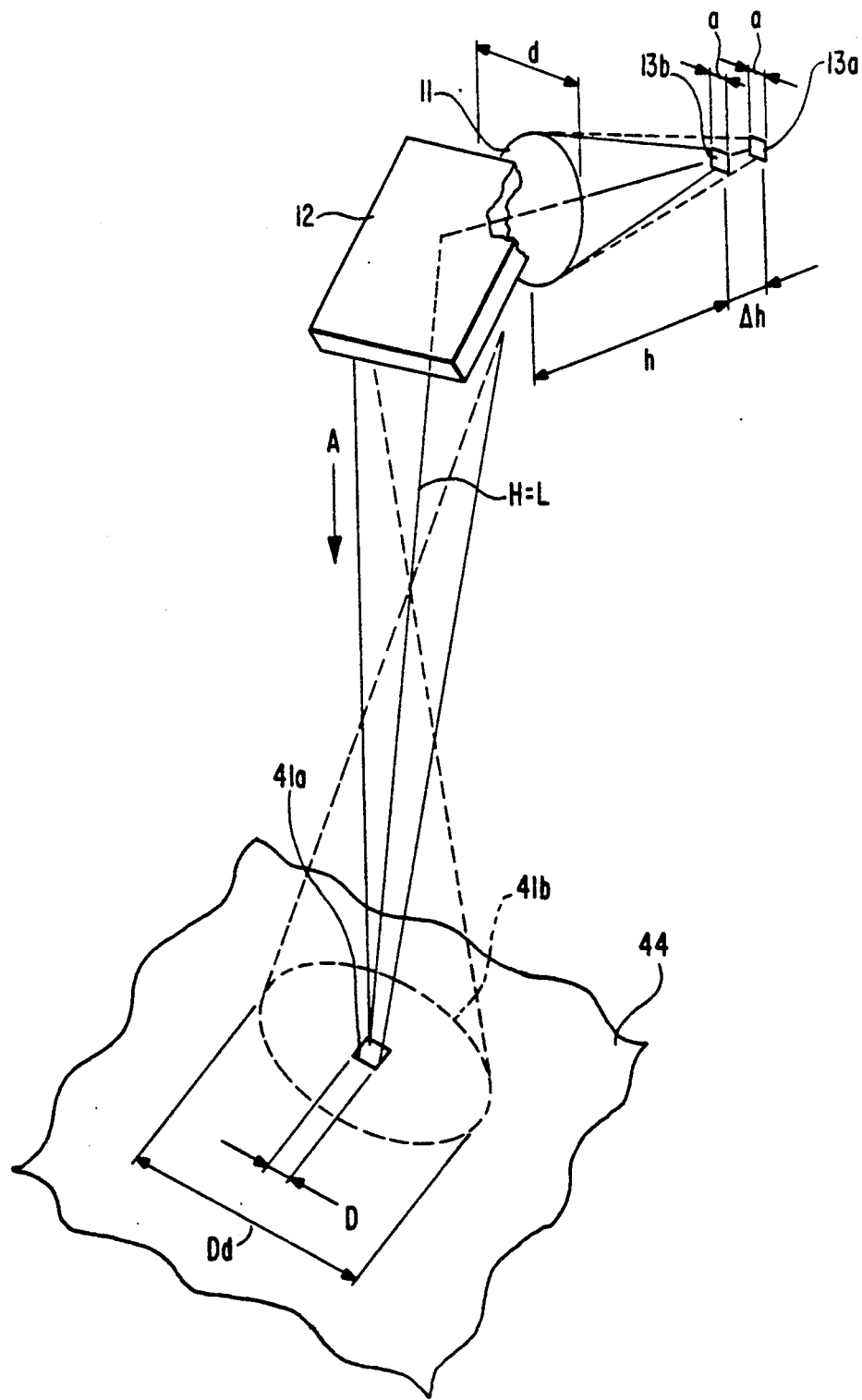
FIG. 4 shows the principle underlying the present invention.

In FIG. 4 which shows the principle of the invention, a plane mirror 12 is located on the optical axis of optics 11. A subject of observation is located in a direction indicated by an arrow A in the figure. The mirror 12 reflects light from the subject to cause it to be propogated along the optical axis of a detection unit 13 (see FIG. 5) which is located at the position 13a of the optics. While the optics 11 converges the light from the mirror 12 onto the detection unit 13, light-sensitive elements constituting the detection unit 13 each produces a voltage proportional to the intensity of incident light. The detection unit 13 may be implemented as a bidimensional sensor in which the light-sensitive elements constituting a light-sensitive array are buried in alignment.

An electric system 17 amplifies the output voltages of the detection unit 13 and outputs the resulting voltages. The detection unit 13 is supported by suitable support means in such a manner as to be movable in a reciprocating motion along the optical axis of the optics 11 between the focal point 13a of the optics (indicated by a phantom line) and a position 13b slightly spaced apart from the focal point 13a. Therefore, the detection unit 13 is moved between the two positions 13a and 13b by moving means.

Figure 5:
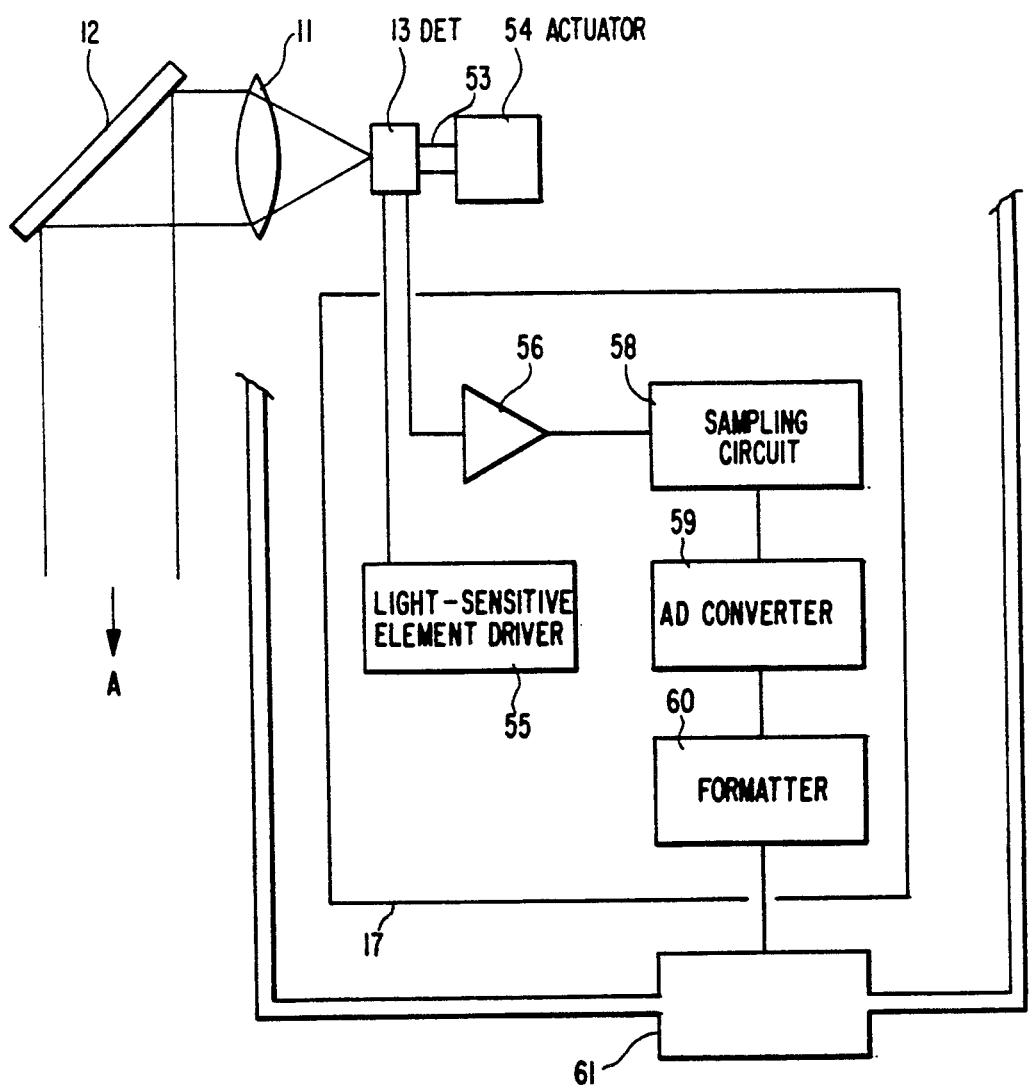
FIG. 5 is a block diagram schematically showing a radiometer embodying the present invention.

FIG. 5 shows a preferred embodiment of the radiometer in accordance with the present invention. As shown, the detection unit 13 is driven by a light-sensitive element driver 55 forming part of the electric system 17. The output of the detection unit 13 is amplified by an amplifier 56, then converted to a digital signal by a sampling circuit 58 and an analog-to-digital (AD) converter 59, then formatted into a modulation signal for transmission by a formatter 60, and then outputted to a transmitting section included in a satellite 61.

In a usual observation mode, the detection unit 13 is located at the focal point 13a of the optics 11. In this position, a focused image from a subject of observation is incident to the detection unit 13 (the positions 13a and 13b are shown in FIG. 4, and the unit 13 of FIG. 5 assumes either of them). On the other hand, in a correction mode, the detection unit 13 is moved to the position 13b along the optical axis of the optics 11. Assume that the subject of observation is, for example, a desert or an ocean whose reflection characteristic varies relatively little. Then, if the focal point of the optics 11 is not coincident with the light-sensitive surface of the detection unit 13, the light image incident to the unit 13 will be blurred over the entire surface of the unit 13. Therefore, light incident to the plurality of light-sensitive elements of the detection unit 13 is substantially uniform.

In FIG. 4, assume that the detection unit 13 (see FIG. 5) movable between the positions 13a and 13b has a pixel pitch a, the optics 11 made up of lenses has a focal distance f and an effective aperture d, and the principal point of the optics 11 is spaced apart from the detection unit 13 by a distance h and from the focal point on the subject 41a side by a distance L. Then, the land resolution D may generally be expressed as:

$$D = H \cdot a / f$$

Where H is a distance between the principal point of the optics 11 and the subject of observation 41a. The distance L may be produced by:

$$L = [(1/f) - (1/h)]^{-1}$$

Under ordinary observation conditions, the distance H is equal to the distance L. This, coupled with the fact that the distances L and H are far longer than the focal distance f and distance h, gives:

$$h = f$$

From the above equations, the beam focused to the position 13b which is deviated by $\Delta l$ from the distance f between the focal point of the optics 11 and the position 13a may be produced by:

$$L = [(1/f) - \{1/(f+h)\}]^{-1}$$

In this case, the beam focused by the optics 11 onto the light-sensitive elements 13b corresponds to the quantity of light produced by integrating light issuing from a range of diameter Dd on the land 41b which is given by:

$$Dd = d \cdot (H-L)/L$$

Hence, if the focal point is shifted, the influence of the scattering in the luminance of the subject range incident to the radiometer can be reduced to:

$$D^2/(\pi \cdot Dd^2/4) \approx (4a^2(f+\Delta h)^2/d^2)/(\pi/(\Delta h)^2)$$

Specifically, assuming $a = 10$ μm, $d = 100$ mm, and $f = 500$ mm, then the above-mentioned influence is reduced to about 1/12 when $\Delta h$ is 200 μm or even to less than 1/100 when the distance of movement is 600 μm.

Further, while the absolute value of the quantity of light incident to the detection unit 13 is determined by the angle of the detection unit 13 looking into the optics 11, the variation thereof due to the movement of the unit 13 can be made negligibly small since the distance of movement can be far smaller than the focal distance of the optics 1.

Generally, the output V of a radiometer is expressed as:

$$V = K[(Lx \cdot \cos \theta + Ha) \cdot \tau + Na] \cdot Tm \cdot To \cdot Rp \cdot G$$

where Lx is a luminance of the subject of interest, $\theta$ is a solar zenith angle, Ha is a sky radiation, $\tau$ is a transmittance, Na is an optical path luminance, Tm is a reflectance of a plane mirror, To is an optics transmittance, Rp is a sensitivity of light-sensitive elements, G is an electric circuit gain, and K is a constant.

Due to the previously stated uniform light, the parameters, except for the sensitivity Rp, are the same throughout the light-sensitive elements. Therefore, output data matching the sensitivities of the pixels of the detection unit 13 can be obtained, i.e. data representative of sensitivity deviations are obtainable.

Furthermore, the luminance data measured with the subject on the land, i.e., (Lx·cos $\theta$+Ha) may be corrected by sky radiation Ha and atmospheric transmittance $\tau$ by use of, for example, an atmospheric model. This will allow sensitivity characteristic data ascribable to changes in the mirror reflectance Tm, optics transmittance To, light-sensitive element sensitivity Rp and electric circuit gain G to be measured.

Of course, the present invention is not limited to the embodiment shown and described. For example, to implement the condition wherein the focal point of the optical means is deviated from the light-sensitive surface of the detection unit 13, the optical distance between the optics 11 and the unit 13 may be changed by, for example, wedged made of optical glass in place of the movement of the unit 13, as will be described with reference to FIGS. 6 and 7.

Figure 6:
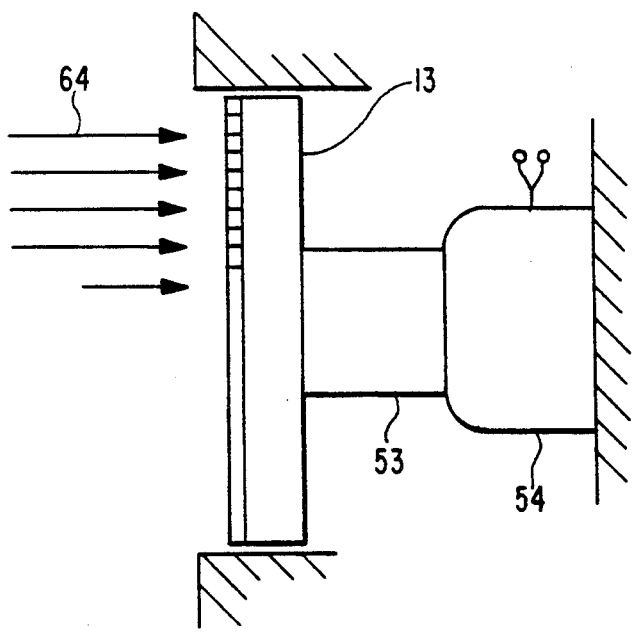
FIGS. 6 and 7 each shows a specific construction of part of the embodiment.

To begin with, the optical distance may be changed either by changing the physical distance or by inserting a transparent object in the optical path and changing the length of the portion thereof over which light is to be propagated. Since the required change in the optical distance is considered to be about 0.2 to 1 mm, any moving method may be used so long as it is mechanically stable. However, the prerequisite is to enhance the accuracy. FIG. 6 shows a relatively simple method using an actuator 54. As shown, the actuator 54 has a piezoelectric material carrying an electrode on both sides thereof and has the piezoelectric material expanded or contracted when a DC voltage is applied between the electrodes. The actuator 54 is affixed to a stationary plate while the detection unit 13 for receiving light 64 is mounted on the actuator 54 either directly or by way of a connecting rod 53. Alternatively, a thin layer of piezoelectric material may be fitted on both sides of an electrode, and a plurality of such subassemblies may be stacked together and connected in parallel to constitute the actuator 54. This kind of actuator 54 will be operable at a lower voltage.

Figure 7:
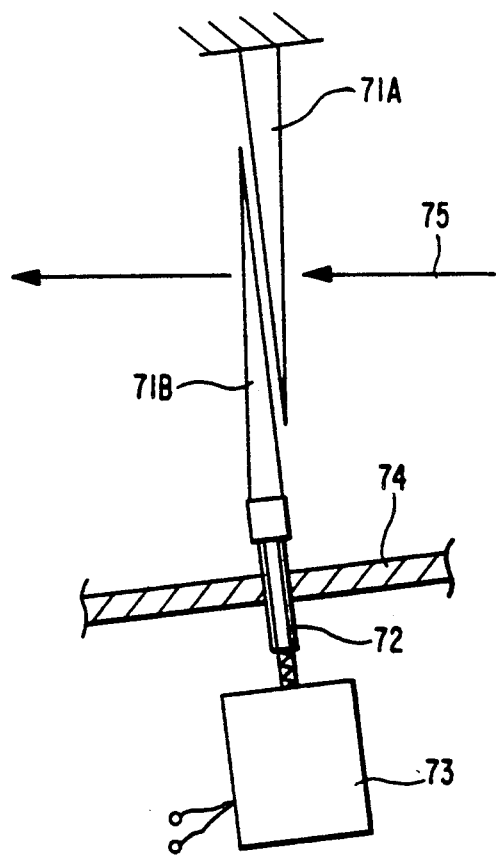

Another method is to propagate the incident light 64 through a transparent material to thereby increase the physical distance by an amount corresponding to the refractive index of the material, compared to the length in vacuum. Specifically, as shown in FIG. 7, wedges 71A and 71B are made of glass or similar transparent material and affixed to a stationary plate 74 while being held in slidable contact with each other or located close to each other. A screw 72 is affixed to one, 71B, of the two wedges and driven into the stationary plate 74. The other end of the screw 72 is connected to a micromotor 73. As the micromotor 73 is rotated, the wedge 71B connected to the screw 72 rises or falls. As a result, the length of propagation of incident light 75 through the wedges 71A and 71B and, therefore, the substantial optical path for the light 75 is changed.

In summary, in accordance with the present invention, the optical distance between optics and a detection unit having a plurality of light-sensitive elements is changed by moving the detection unit along the optical path of the optics or by use of transparent wedges. In this condition, any desired range on the land is observed. At the same time, the luminance of the range of interest is measured from, for example, a high tower or from an aircraft to compensate for the diffusion and absorption by the atmosphere. This insures correction based in uniform reference light having any desired luminance, i.e., allows the changes in the reflection characteristic of a plane mirror and the transmission characteristic of lenses included in the optics, fluctuations in the sensitivity of all the light-sensitive elements, and fluctuations in the measurement of an electric system to be detected.

Although the invention has been described with reference to a specific embodiment, this description is not meant to be construed in a limited sense. Various modifications of the disclosed embodiment will become apparent to persons skilled in the art upon reference to the description of the invention. It is therefore contemplated that the appended claims will cover any modifications or embodiments as fall within the true scope of the invention.

I claim:

1. A radiometer mounted on an aircraft, satellite or similar flying body for observing reflections or radiations of visible rays or infrared rays from the land or the sea, said radiometer comprising:
   optical means for converging the visible rays or the infrared rays incident thereto;
   a plurality of light-sensitive means for receiving rays converged by said optical means and each for delivering an electrical signal representative of intensity of said rays;
   means for changing an optical distance from said optical means to said light-sensitive means between a focused distance and a defocused distance; and
   means for detecting sensitivities of said plurality of light-sensitive means by detecting the electrical signals delivered from said plurality of light-sensitive means while said optical distance is changed to the defocused distance.

2. A radiometer as claimed in claim 1, wherein said changing means comprises means for moving said plurality of light-sensitive means in a direction of an optical axis of said optical means.

3. A radiometer as claimed in claim 2, wherein said moving means comprises a piezoelectric actuator fixed at one end thereof and carrying said plurality of light-sensitive means at the other end thereof and movable in a direction of the optical axis of said optical means.

4. A radiometer as claimed in claim 1, wherein said changing means comprises two transparent wedge-shaped members located to face each other at inclined surfaces thereof, one of said wedge-shaped members being movable in parallel to said inclined surfaces.

5. A radiometer for observing at least one of a reflection ray and radiation ray from a subject of observation, said radiometer comprising:
   optical means for receiving said observed rays and producing converged rays;
   light-sensitive means for receiving said converged rays from said optical means, said light-sensitive means including a plurality of light-sensitive elements, each of which produces an electrical signal proportional to an intensity of incident rays; and,
   detecting means responsive to the electrical signals produced by said plurality of light-sensitive elements for detecting sensitivity deviations of said plurality of light-sensitive elements while focal points of said converged rays from said optical means are not coincident with a surface of said light-sensitive means.

6. A radiometer as claimed in claim 5, wherein said light sensitive means includes said plurality of light-sensitive elements placed in an array to form a bidimensional sensor.

7. A radiometer as claimed in claim 5, further comprising an electric means for processing said electric signals output by said light sensitive means.

8. A radiometer as claimed in claim 7, wherein said electric means includes an amplifier, a sampling circuit, an analog-to-digital converter and a formatter to convert said electric signals to a modulation signal for transmission.

9. A radiometer as claimed in claim 5, wherein said optical means includes a rotatable plane mirror and an optics, wherein said rotatable plane mirror reflects said observed incident rays to said optics and said optics converges said observed incident rays.

10. A radiometer as claimed in claim 5, further comprising means for changing an optical distance between said optical means and said light-sensitive means.

11. A radiometer as claimed in claim 10, wherein said changing means includes an actuator and a connecting rod, wherein a first end of said connecting rod is attached to said actuator and a second end of said connecting rod is attached to said light-sensitive means.

12. A radiometer as claimed in claim 11, wherein said actuator includes a piezoelectric material, said piezoelectric material being responsive to a DC voltage.

13. A radiometer as claimed in claim 10, wherein said changing means includes an object which is placed between said optical means and said light-sensitive means to increase the optical distance said converged rays travel by an amount corresponding to a refractive index of said object.

14. A radiometer as claimed in claim 13, wherein said object includes a first wedge and a second wedge, said first and second wedges being held in slidable contact with each other.

15. A radiometer for observing electromagnetic rays from a subject of observation, said radiometer comprising:
   an optical arrangement that receives the observed rays and produces converging rays;
   photoelectric elements that receive the converging rays and that produce respective electrical outputs that are functions of ray intensities incident upon respective photosensitive layers of said elements; and,
   a detection device responsive to the electrical outputs that detects sensitivity deviations of said photoelectric elements while focal points of the converging rays fail to converge on the respective photosensitive layers of said photoelectric elements.

16. A radiometer as claimed in claim 15, further comprising a processor that processes the electrical outputs from said photoelectric elements.

17. A radiometer as claimed in claim 15, further comprising an arrangement that alters an optical distance between the optical arrangement and the photoelectric elements, whereby the optical distance is altered between a first distance, at which the converging rays converge on the respective photosensitive layers of said photoelectric elements, and a second distance, at which the converged rays fail to converge on the respective photosensitive layers.

* * * * *